United States Patent
Alapati et al.

(10) Patent No.: US 9,928,068 B2
(45) Date of Patent: Mar. 27, 2018

(54) HARDWARE MANAGED DYNAMIC THREAD FETCH RATE CONTROL

(71) Applicant: International Business Machines Corporation, Armonk, NY (US)

(72) Inventors: Sangram Alapati, Austin, TX (US); Puneeth A. Bhat, Bangalore (IN); Satish K. Sadasivam, Erode (IN)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 14/960,863

(22) Filed: Dec. 7, 2015

(65) Prior Publication Data

US 2017/0161076 A1    Jun. 8, 2017

(51) Int. Cl.
G06F 9/30    (2006.01)
G06F 9/38    (2006.01)

(52) U.S. Cl.
CPC ........ *G06F 9/3804* (2013.01); *G06F 9/30181* (2013.01); *G06F 9/3851* (2013.01); *G06F 9/3861* (2013.01)

(58) Field of Classification Search
CPC ... G06F 9/30181; G06F 9/3804; G06F 9/3851
See application file for complete search history.

(56) References Cited

U.S. PATENT DOCUMENTS

| | | | |
|---|---|---|---|
| 8,756,605 B2 | 6/2014 | Aingaran et al. | |
| 2008/0282251 A1* | 11/2008 | Bruce | G06F 9/485 718/103 |
| 2009/0193231 A1* | 7/2009 | Gschwind | G06F 9/3804 712/205 |
| 2014/0201507 A1 | 7/2014 | Jayaseelan et al. | |
| 2014/0229721 A1 | 8/2014 | Forsyth et al. | |

OTHER PUBLICATIONS

Wang et al., "A Modified Instruction Fetch Control Mechanism for SMT Architecture", IEEE, 2007.*
Liqiang et al., "Improving performance through combining branch classifier and fetch controller into SMT processors," Engineering Village, Proceedings of the International Conference on Parallel and Distributed Processing Techniques and Applications, PDPTA'04, Abstract, 2004, 1 page, vol. 3, Copyright 2015 Elsevier Inc.

* cited by examiner

*Primary Examiner* — Benjamin Geib
(74) *Attorney, Agent, or Firm* — Jared C. Chaney

(57) ABSTRACT

A system may include a memory to store an enhancer to identify a branch instruction, having a miss-prediction rate above a threshold, in an executing thread. The system may additionally include an instruction update unit to modify an operation code (opcode) of the branch instruction, where a modified opcode of a branch instruction indicates an instruction fetch priority for an executing thread. The system may further include a processor, having an instruction decode unit to set a modified instruction fetch priority of the first executing thread based on the modified opcode of the branch instruction, and an instruction fetch unit to retrieve instructions for the first executing thread from the instruction cache at a first rate, the first rate indicated by the modified instruction fetch priority of the first executing thread.

20 Claims, 4 Drawing Sheets

HARDWARE MANAGED DYNAMIC THREAD FETCH RATE CONTROL

BACKGROUND

The present disclosure relates to computer systems, and more specifically, to a microarchitecture based solution for hardware controlled dynamic enhancement of thread instruction fetch rates on a simultaneous multithreading processor.

Computer executable instruction belonging to a computer program may be allocated to, and executed in, individual threads of a computer system. Computer processor resources for executing the program instructions in each thread may be allocated amongst the executing threads of a computing system based on a thread hierarchy informed by a priority assigned to each thread. Processors may execute the program instructions included in each thread in sequences informed by the structure of the computer programs issuing the instructions. Some computer processors may execute these program instructions in a different order than the order indicated by the computer program by making speculations as to which execution path the computer program will follow, or which instructions should be executed, in the future. This hardware speculation may influence the instruction throughput of, or the rate at which instructions are executed by, processors.

SUMMARY

According to embodiments of the present disclosure, a system for dynamic thread instruction fetch rate control may include a memory to store an enhancer to identify a branch instruction in a first executing thread, the branch instruction having a miss-prediction rate above a threshold, wherein threads executing on the system having an instruction fetch priority to determine a rate at which instructions belonging to a respective executing thread are retrieved from an instruction cache, and the instruction fetch priority of the first executing thread initially specifies a default rate for fetching instructions. The system may additionally include an instruction update unit to modify an operation code (opcode) of the branch instruction of the first executing thread, wherein a modified opcode of a branch instruction indicates an instruction fetch priority for an executing thread. The system may further include a processor, having an instruction decode unit to set a modified instruction fetch priority of the first executing thread based on the modified opcode of the branch instruction, and an instruction fetch unit to retrieve instructions for the first executing thread from the instruction cache at a first rate, the first rate indicated by the modified instruction fetch priority of the first executing thread.

Other embodiments are directed to a method for dynamic control of thread instruction fetch rates in computing systems having simultaneous multithreading processors.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
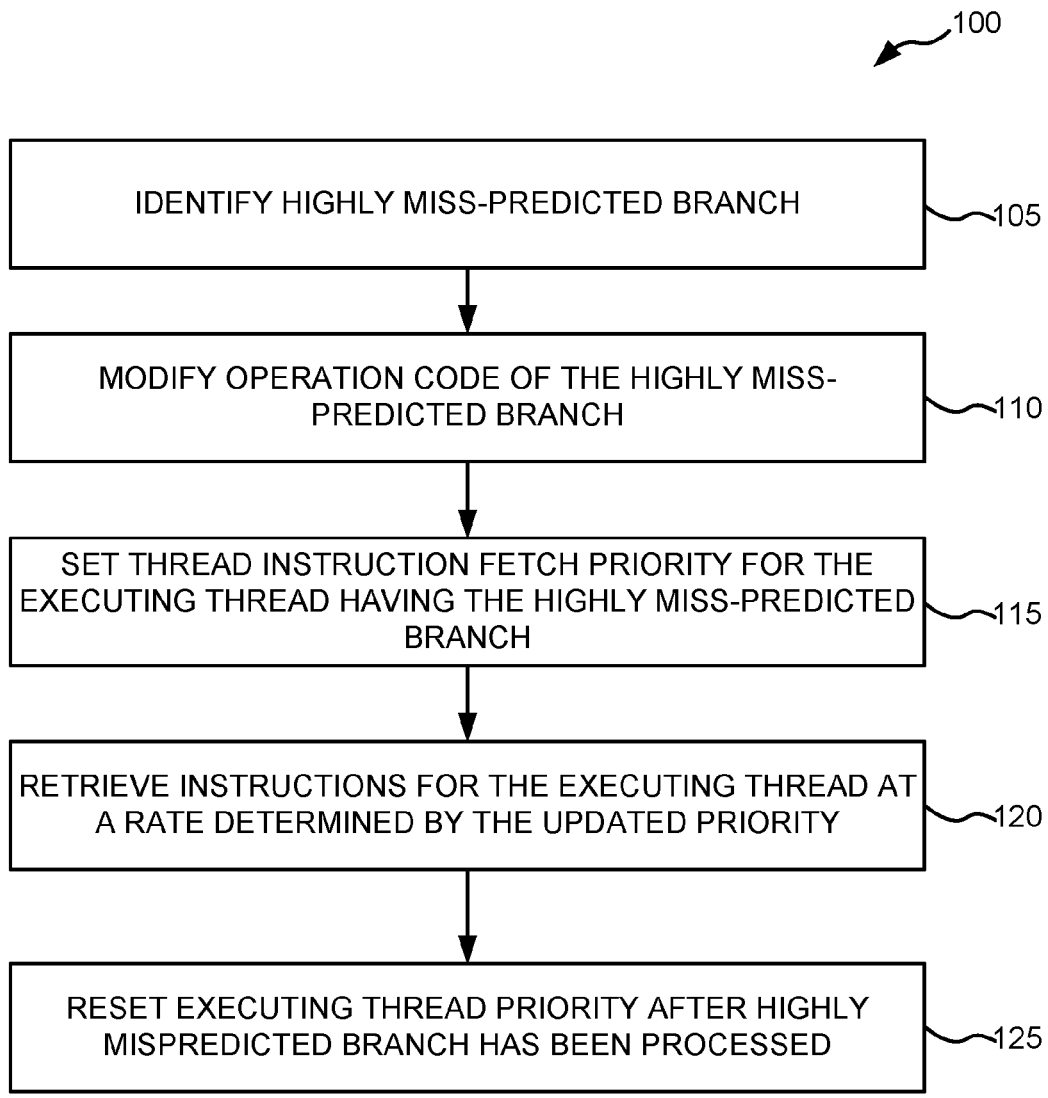
FIG. 1 depicts a flowchart of a set of operations for implementing a system for hardware controlled enhancement of thread instruction fetch rate in a computing system having a simultaneous multithreading processor, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer systems, more particular aspects relate to a microarchitecture based solution for hardware controlled dynamic enhancement of thread instruction fetch rates on a simultaneous multithreading processor. While the present disclosure is not necessarily limited to such applications, various aspects of the disclosure may be appreciated through a discussion of various examples using this context.

Hardware speculation may have a significant impact in determining the thread performance of simultaneous multithreading (SMT) processors. These processors may execute program instructions out of order by speculating, using processor hardware, about which program instructions may need to be executed in the future. One facet of this hardware speculation is branch prediction. Branch instructions may play an important role in determining the execution path a computer program or thread follows, and hence the program instructions that may be executed, after execution of a given program instruction. Consequently, the ability to reliably (or accurately) predict the branch decision of a branch instruction (e.g., predicting with instruction or address a thread will transfer instruction execution to after a branch is executed) may impact the performance of a processor configured to execute instructions out of order. Miss-predicting a branch, for example, may cause a processor to dedicate resources to executing instructions that are not in the execution path of an executing thread. The execution path followed by an executing thread after execution of certain branch instructions may depend on the nature and characteristics of the workload of a computing system and of the control flow of the computer program having the branch instruction. The branching statistics associated with these branches (e.g., the likelihood of a branch taking one path or another) may depend on variables that change throughout the execution of the computer program having the branches. Processors, consequently, may have a difficult time improving thread performance by predicting these branches.

Embodiments of this disclosure are based on a recognition that processor performance can be improved by controlling the instruction fetch rate of threads based on the presence of highly miss-predicted branches (e.g., hard to predict branches). The present disclosure provides a microarchitecture based solution for capturing hard to predict branches, and controlling the execution flow of an executing thread having these branches, to improve the throughput of SMT processors. The microarchitecture based solution may include identifying a highly miss-predicted branch in a computer program and modifying the operation code (hereinafter, "opcode") of the branch instruction to inform a processor executing the instruction that this is a highly miss-predicted branch. A processor, after detecting the modified opcode, may modify (e.g., by decreasing) the execution priority of the thread having the highly miss-predicted branch. The processor may then retrieve and/or execute instructions for the thread at a rate informed by the modified execution priority until the highly miss-predicted branch instruction is executed. The processor may then reset the execution priority of the thread and proceed to retrieve and/or execute instructions at the thread's normal instruction fetch rate. This solution may improve processor throughput by limiting the execution of instructions that are outside the execution path of a given thread.

As used herein, an opcode may be a portion of a machine executable instruction (e.g., a program instruction) specifying an operation to be performed by a processor. Each opcode in a computer program may be associated with (e.g., located or referenced by) a unique program address. An opcode may include a field of bits for identifying the operation encoded by the opcode. An opcode may further include one or more reserved bits that may typically be ignored by processors when decoding the opcode (e.g., determine what operation is to be performed given the opcode). Other portions of a machine executable instruction may include operands having, for example, data that may be used in processing or executing the operation identified by the opcode.

A thread may be an atomic (e.g., a smallest) sequence of related program instructions that may be managed independently by an operating system and/or a processor. In some embodiments, the program instructions belonging to a computer program may be assigned to a single thread. In other embodiments, the program instructions belonging to a computer program may be allocated to more than one thread.

Simultaneous multithreading processors may include processors configured to simultaneously execute instructions from more than one thread in a given stage of an execution pipeline of the processor. These processors may be configured to fetch and process instructions from multiple threads in a single processing cycle. Some resources of SMT processors may be shared between concurrent or simultaneously executing threads. As a result of this resource sharing, the efficiency or instruction execution throughput of a computing system having SMT processors may be effected by the allocation of the shared processor resources between the threads.

Figure 4:
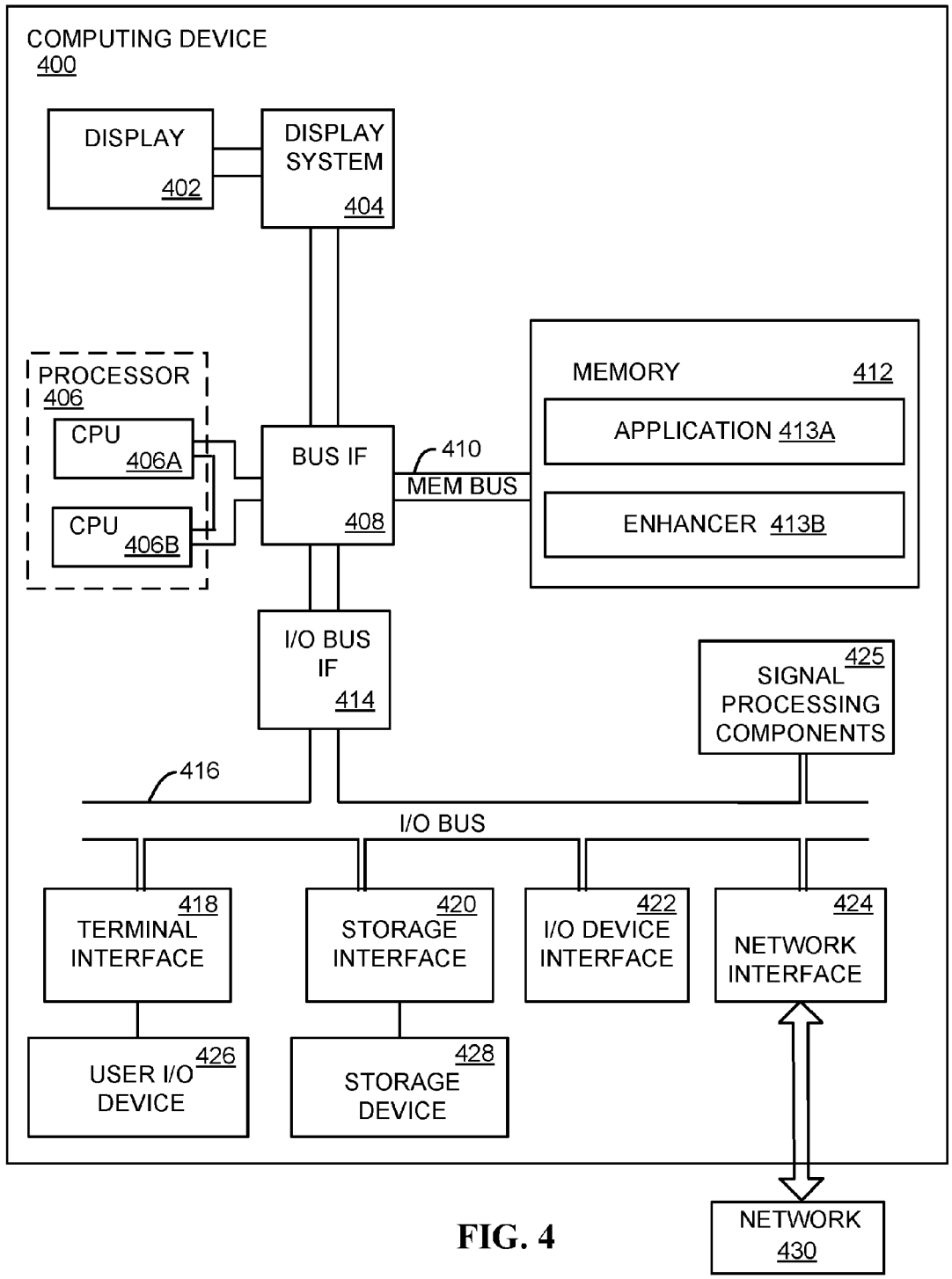
FIG. 4 depicts a block diagram of a computing device for implement a system for hardware controlled enhancement of thread instruction fetch rate in a simultaneous multithreading processor.

Referring now to the figures, FIG. 1 depicts a flowchart 100 of a set of operations for implementing a system for hardware controlled enhancement of thread instruction fetch rate in a computing system having a SMT processor, according to various embodiments. The operations of flowchart 100, for example, may be performed by a computing system to improve the instruction execution throughput of an SMT processor while executing one or more computer programs. In some embodiments, the operations of flowchart 100 may be performed by a processor of a computing system, such as the computing device 400 (FIG. 4). The processor may perform the operations of flowchart 100 by actuating one or more electronic circuits or by executing one or more computer programs stored in a memory of the computing system.

A processor may begin the operations of flowchart 100 at operation 105 by identifying a highly miss-predicted branch in a computer program. Identifying a highly miss-predicted branch may include obtaining the program address of the branch and collecting (and analyzing) information about, for example, rate at which the branch decision is correctly or incorrectly predicted by the processor. A highly miss-predicted branch may be a branch instruction that has a high rate of being miss-predicted by the hardware speculation components of a processor. In some embodiments, a highly miss-predicted branch may be a branch instruction having a miss-prediction rate above a threshold value. In other embodiments, a highly miss-predicted branch may be a branch instruction within a group of branch instructions, where the group of branch instructions are responsible for a threshold percentage of branch miss-predictions. In some embodiments, the highly miss-predicted branch may be a branch located at a given position or location of a computer program, and associated with a certain control sequence or section of code of the program. For example, a highly miss-predicted branch may be a branch that determines whether to execute a sequence of code in response to processing a data value received from an input stream. In other embodiments, the highly miss-predicted branch may be a specific type of branch. For example, a given computer program may be structured such that all "branch if equal" operations are difficult to predict.

The highly miss-predicted branch may be identified by a software application configured to analyze computer programs and profile branch instructions belonging to the programs. A software application so configured may be referred to as an "enhancer." In some embodiments, an enhancer may be a software compiler or a component of a software compiler configured to profile branch instructions at compile time based on information derived from compiling source code into an executable computer program. The information collected by software compiler based enhancers may include statistical information concerning the likelihood of a branch being taken (e.g., a count of the number of times a branch was taken or miss-predicted). Software enhancers may additionally collect information concerning correlations between a given branch (or branch decision) and other aspects of a computer program.

In certain embodiments, the enhancer may be a software program configured to dynamically monitor a computer program, while it is executing (at run time), and profile branch instructions based information collected during the execution of the computer program. This dynamic enhancer may identify a highly miss-predicted branch belonging to an executing computer program based on information collected from a processor executing the program. A dynamic enhancer, for example, may obtain the address of a highly miss-predicted branch from a branch history table (e.g., the branch history rolling buffer, BHRB, of International Business Machines' POWER processor) associated with a processor.

A processor may continue the operations of flowchart 100 by executing operation 110. Executing operation 110 may include modifying the opcode of a highly miss-predicted branch instruction to enable a processor identify the branch when decoding its opcode. In some embodiments, one or more reserved bits in the opcode of branch instructions may be modified to identify the highly miss-predicted branch. Modifying the opcode of a branch instruction may include identifying the program address of the branch instruction and changing one or more reserved bits of the branch opcode located at the identified address. The modified reserved bits may serve as a thread execution priority field for determining an instruction fetch rate for a thread having the branch instruction, as described herein.

More than one reserved bit may be used to indicate multiple priority levels for threads having the highly miss-predicted branch. A first priority level, for example, may specify a default instruction fetch rate. When a first highly miss-predicted branch is encountered in an executing thread, the priority level may be set to a second level, specifying a lower (e.g., slower) instruction fetch rate than the default rate. When a second highly miss-predicted branch is encountered in the same executing thread, the priority level may be set to a third level, specifying a second lower instruction fetch rate than specified by the second priority level. This second lower instruction fetch rate may be a lower rate than the default rate.

A processor may execute program instructions of a software compiler based enhancer to modify the opcode of a branch instruction while converting a source code representation of a computer program into computer executable code at compile time. In some embodiments a processor may execute program instructions of a compiler based enhancer to modify the opcode after the computer executable code is generated.

A dynamic enhancer may include a software module or application configured with program instructions for modifying opcodes (e.g., an opcode editor) of executing computer programs at run time. In some embodiments, a processor may execute program instructions of a dynamic enhancer to cause the processor to further execute program instructions of an opcode editor to modify the opcode of a branch instruction by modifying the computer executable code of a computer program stored on a storage device of a computer system. In some embodiments, a processor may execute program instructions of the opcode editor to modify the opcode of a branch instruction by directly modifying the branch instruction stored in an instruction memory of a computer system. In other embodiments, a processor may execute the program instructions of an opcode editor to modify the opcode of a branch instruction by directly modifying the branch instruction in an instruction cache associated with a processor of a computer system.

The opcode for a highly miss-predicted branch instruction may be modified while a computer program having the branch instruction is executing on a processor. The opcode of a branch instruction, for example, may be modified to identify the branch instruction as a highly miss-predicted branch at a first time during the execution of a computer program. The opcode of the same branch instruction (e.g., the branch instruction located at the same program address) may be modified again at a second time, subsequent to the first time, during the execution of the computer program to indicate that the branch instruction is no longer considered a highly miss-predicted branch.

A processor may continue the operations of flowchart 100 by executing operation 115. Execution of operation 115 may include setting the thread instruction fetch priority for a thread having a highly miss-predicted branch (hereinafter, the executing thread). Setting the thread instruction fetch priority may include retrieving a branch instruction from an instruction cache and decoding the retrieved instruction. A processor may then determine that the decoded branch instruction is a highly miss-predicted branch by examining reserved bits of the instruction's opcode. A processor may then set the priority of the executing thread according to a priority indicated by the reserved bits of the modified opcode.

When a processor decodes a highly miss-predicted branch, the processor may modify the execution priority of the executing thread to reduce the instruction fetch rate of the thread. In some embodiments, the processor may additionally modify the execution priority of another thread executing on the computing system to increase that thread's instruction fetch rate (e.g., increase the thread's priority level). The instruction fetch rate of a thread may be the rate at which an instruction fetch unit of a processor retrieves instructions belonging to the thread from the processor's instruction cache.

In addition to setting the instruction fetch rate, the processor may track the execution of the highly miss-predicted branch instruction by assigning the branch instruction to an instruction group (e.g., a collection of instructions that will be executed by the same execution unit in a processor) in an instruction dispatch queue of a processor. The processor may then set a bit in a tracking register (e.g., an instruction fetch rate queue, IFRQ, register) to identify the instruction group having the highly miss-predicted branch. The bit may then be reset once the instruction group having the highly miss-predicted branch has been executed. In some embodiments, the bit may be reset once the branch direction (or decision) of the highly miss-predicted branch is determined.

A processor may execute operation 120 by retrieving instructions for the executing thread at a rate determined by the updated priority of the executing thread. When the priority of the executing thread is modified in response to decoding a highly miss-predicted branch, a processor may retrieve program instructions belonging to the executing thread at a lower (or slower) rate than the rate specified for retrieving program instructions for the execution thread when the execution priority of the thread is not so modified (e.g., a default execution rate). A processor may retrieve instructions from an instruction cache at this lower rate while a bit is set in the tracking register indicating that an instruction group having a highly miss-predicted branch belonging to the executing thread is still being processed by the processor. As described with reference to FIG. 2, "processing" (or "executing") a branch instruction may include decoding the instruction, assigning the instruction to an instruction group, waiting until an execution unit becomes available, and executing the instruction by an execution unit. Accordingly, the tracking register may indicate that an execution unit has not processed a branch instruction at any time from when the instruction is decoded up to and including the time when a branch decision is made. Thus, the time period from when a branch is decoded to the time that an execution unit completes the branch could be much longer than the time to execute the instruction by the execution unit. According to various embodiments, an instruction fetch rate may be reduced during this processing time period.

The computing system may execute operation 125 by resetting the priority of the executing thread after a highly miss-predicted branch belonging to the executing thread has been processed. In some embodiments, the computing system may determine that the highly miss-predicted branch has been processed once, for example, by inspecting a tracking register of a processor that stores an indication that an instruction group having the branch has been executed.

While an example embodiment of the operations of flowchart 100 is described herein, other variants of the flowchart 100 are contemplated. In some variants one or more operations of the flowchart 100 may be executed in a different order than indicated in FIG. 1. In other embodiments, additional operations may be added to further the execution of the operations of flowchart 100. For example, in some embodiments, after modifying the fetch priority of the executing thread (as described in operation 115), the computing system may identify a second highly miss-predicted branch instruction (in the same thread) before (e.g., earlier in time) the first highly miss-predicted branch instruction is completed or executed. In this scenario, the computing system may modify (e.g., reduce) the fetch priority (and consequently, the instruction fetch rate) of the executing thread a second time. Modifying the fetch priority a second time may include reducing the fetch priority to a lower priority level than was set by the first highly miss-predicted branch.

The computing system may track the second miss-predicted branch instruction, and reset the fetch priority of the executing thread after the second highly miss-predicted branch instruction is executed, as described herein. The computing system may concurrently track two or more highly miss-predicted branch instructions and set and reset the fetch priority of the executing thread based on identifying and executing each branch instruction.

Figure 2:
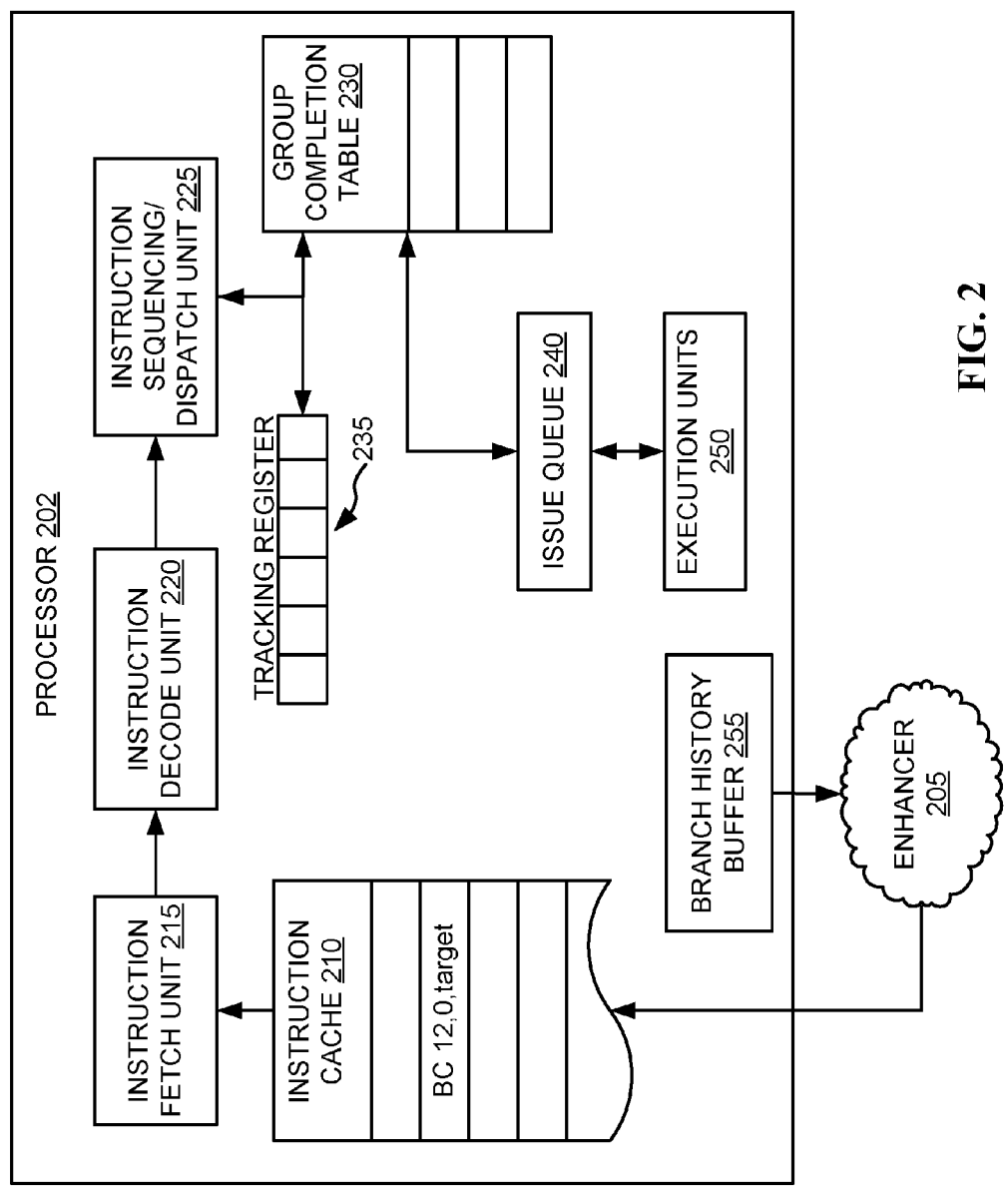
FIG. 2 depicts a system for hardware controlled dynamic enhancement of the instruction fetch rate of threads executing on an SMT processor, according to various embodiments.
Figure 3:
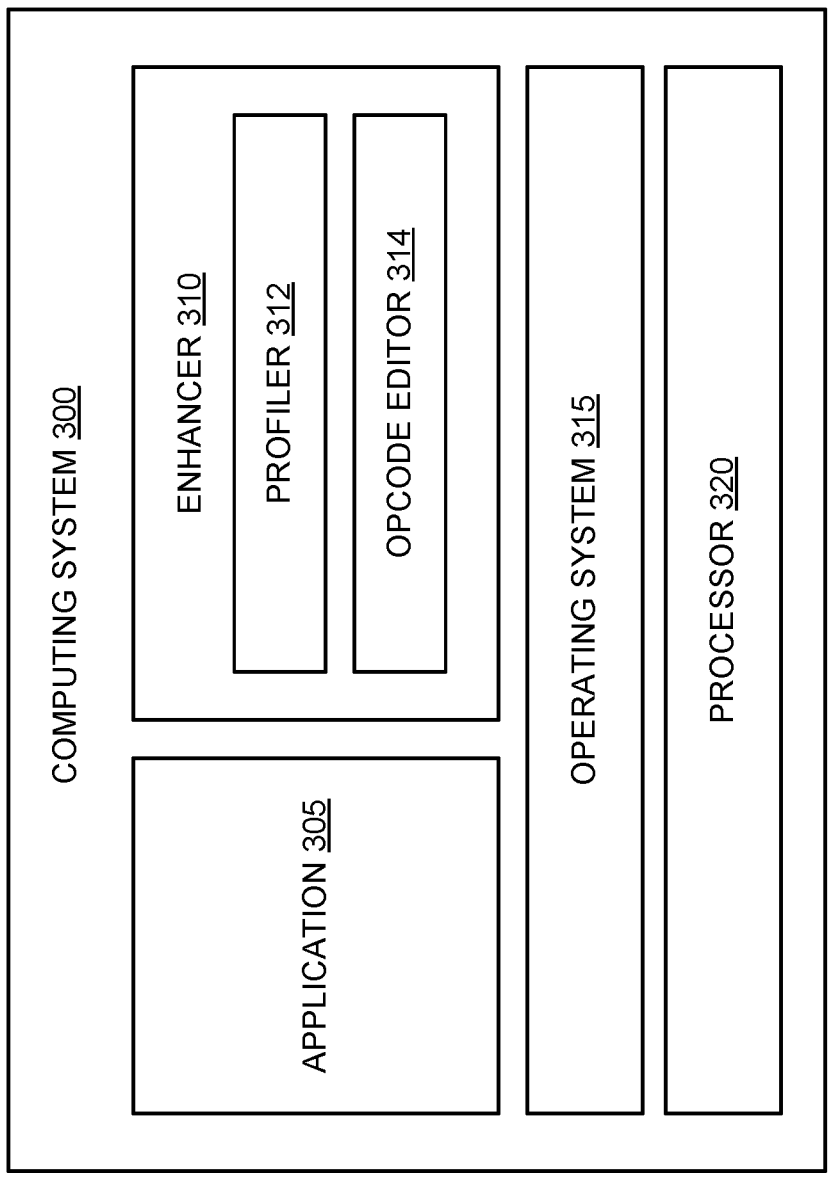
FIG. 3 depicts a computing system for implementing a system for hardware controlled dynamic enhancement of the instruction fetch rate of thread executing on an SMT processor, according to various embodiments.

FIG. 2 depicts a system 200 for hardware controlled dynamic enhancement of the instruction fetch rate of threads executing on an SMT processor, according to various embodiments. The system 200 may include SMT processor 202 and enhancer 205. The system 200 may be a computing system such as the computing device 400 (FIG. 4) and/or the computing system 300 (FIG. 3).

The enhancer 205 may be a software application configured with computer executable code to cause a processor 202 to profile, and modify the opcodes of, branch instructions belonging to a computer program executing on the system 200. The branch instructions may be profiled based on information provided to the enhancer 205 by the processor via branch history buffer 255. The enhancer 205 may provide modified opcodes for identifying highly miss-predicted branches to the processor 202 via instruction cache 210. In some embodiments, the enhancer may modify the opcodes of branch instructions while they are cached in the instruction cache 210. In other embodiments, the enhancer 205 may modify the opcodes of highly miss-predicted branches instructions before the instructions are dispatched to the processor 202. The enhancer 205, for example, may modify the opcodes while the branch instructions are stored in an instruction memory of a computing system. In another example, the enhancer 205 may modify the opcodes while the branch instructions are stored on a storage device associated with a computing system, such as storage device 428 (FIG. 4).

The SMT processor 202 may include instruction cache 210, instruction fetch unit 215, instruction decode unit 220, instruction sequencing and dispatch unit 225, group completion table (GCT) 230, tracking register 235, issue queue 240, execution units 250, and branch history buffer 255. The SMT processor 202 may further include firmware, microcode, finite state machines, and other logic circuits for coordinating the interactions of the components of the processor to execute program instructions and other logic operations to implement the operations of the present disclosure.

The instruction cache 210 may be an area of cache memory located in one of the levels of the cache hierarchy of the processor 202. The instruction cache 210, for example, may be a level 1 cache allocated for storing program instructions pending execution by the processor 202. In some embodiments, the instruction cache 210 my receive program instructions (e.g., in the form of opcodes) to be executed by the processor 202 from an operating system or other instruction loader applications. A program instruction stored in the instruction cache may include a data value (e.g., one or more bits) to identify a thread to which the instruction belongs. In some embodiments, the processor 202 may provide an interface via, for example, a set machine level instructions or processor interrupt operations, for updating or modifying program instructions within the instruction cache 210. The enhancer 205 may use this interface to modify the opcodes of branch instructions, as described herein. The instruction cache 210 may provide the cached program instructions to instruction fetch unit 215.

The instruction fetch unit 215 may include a set of one or more logic circuits and registers for determining and storing the execution priority and/or instruction fetch rate of each thread executing on the processor 202. In some embodiments, the instruction fetch unit 215 may receive input from tracking register 235 indicating whether a highly miss-predicted branch instruction belonging to an executing thread is currently being processed by the processor 202. The instruction fetch unit 215 may update the execution priority and/or instruction fetch rate of executing threads base on the configuration of bits in the tracking register 235, as described herein. The instruction fetch unit 215 may retrieve program instructions for each executing thread from instruction cache 210 and provide the program instructions to instruction decode unit 220. The program instructions may be provided to the instruction fetch unit 215 at a rate determined by a thread's priority and/or instruction fetch rate. The priority of an executing thread, and thus the instruction fetch rate of the thread, may be dynamically updated in response to bit changes in tracking register 235.

The instruction decode unit 220 may receive program instructions from instruction fetch unit 215 for decoding. Decoding a program instruction may include identifying the operation to be performed by the processor 202 based on the instruction's opcode and associated operands. A decoded instruction may be forwarded to instruction sequencing and dispatch unit 225 for further processing. When the instruction decode unit decodes a branch instruction having an opcode modified as described herein, the instruction decode unit may mark the branch instruction before forwarding it to the instruction sequencing and dispatch unit 225. Marking the instruction may include providing a flag or other data value along with the decoded instruction to the instruction sequence and dispatch unit 225.

The instruction sequencing and dispatch unit 225 may receive decoded instructions from instruction decode unit 220 for sequencing and dispatching to execution units. The instruction sequencing and dispatching unit 225 may assign the decoded instructions to instructions groups. The instruction groups may then be provided to group completion table 230, to await execution by execution units 250. When an instruction group includes a highly miss-predicted branch instruction, the instruction sequencing and dispatch unit 225 may set a bit in a bit position of tracking register 225 corresponding with the instruction group. The bit may provide a signal to the instruction fetch unit 215 to modify (e.g., reduce) the instruction fetch rate of executing thread, as described herein.

The group completion table 230 may receive instruction groups from the instruction sequencing and dispatch unit 225 for dispatch to execution pipelines. As execution units become available, the group completion table 230 may issue instructions from each group to respective issue queues 240 and execution units 250. Once all instructions in an execution group are completed, the execution group may be marked as complete in the group completion table 230. Marking an instruction group having a highly miss-predicted branch as complete may cause the tracking register 235 bit corresponding with the instruction group to be reset. In some embodiments, the corresponding tracking register 235 bit may be reset before the instruction group is marked complete if the branch decision of the highly miss-predicted branch is determined before execution of all instructions in the instruction group.

In some embodiments, the SMT processor 202 may include, in addition to the instruction cache 210, a second cache (not shown) for storing partially decoded instructions. The second cache, for example, may be a variant of the instruction cache 210, such as Intel Corporation's micro-op cache. The second cache may receive partially decoded instructions from instruction decode unit 220. The second cache may provide the partially decoded instructions to a second instruction fetch unit and instruction decode unit for further decoding, as described herein. In some embodiments, the second instruction fetch unit and instruction decode unit may be the instruction fetch unit 215 and instruction decode unit 220, respectively. In embodiments where the SMT processor 202 includes the second cache, the operations of this disclosure may be further executed to control the instruction fetch rate from the second cache, as described herein.

A consequence of the operations described herein is that the fetching of instructions for an executing thread having a highly miss-predicted branch instruction may be slowed until the highly miss-predicted branch instruction is executed or the branch decision is determined. The processor 202 may then allocate more resources to other threads (e.g., threads not having highly miss-predicted branches). Slowing the instruction fetch rate of an executing thread in this manner may further reduce the amount of program instructions that the processor may speculatively execute (e.g., by trying to predict the branch decision of the highly miss-predicted branch) on the behalf of the thread, thus reducing the cost of incorrect speculation.

FIG. 3 depicts a computing system 300 for implementing a system for hardware controlled dynamic enhancement of the instruction fetch rate of thread executing on an SMT processor, according to various embodiments. The computing system 300 includes application 305, enhancer 310, operating system 315, and processor 320. In some embodiments, the system 200 may be a computing system such as the computing device 400 (FIG. 4).

The application 305 may be a computer program having one or more highly miss-predicted branches. The application 305 may be loaded on the computing system 300 and executed by processor 320.

The enhancer 310 may be software application configured to analyze and/or profile the application 305 to identify highly miss-predicted branches. The enhancer 310 may be a software compiler based enhancer and/or a dynamic enhancer, as described herein. In some embodiments, the enhancer 310 may include profiler component 312 and opcode editor component 314.

The profiler component 312 may be a module or software application configured with computer executable code to collect information about branch instructions belonging to the application 305. In some embodiments, the profiler component 312 may analyze the source code or machine executable code of the application 305 while the application is stored on a storage device of the computing system 300. In certain embodiments, the profiler application 312 may analyze the machine executable code of the application 305, while the application is executing on the processor 320, by accessing the program instructions stored in a memory (e.g., an instruction memory) of the computing system 300. In other embodiments, the profiler component 312 may analyze the machine executable code of the application 305 while the application is executing by accessing the program instructions stored in an instruction cache in the processor 320.

The opcode editor 314 may be a module and/or software application for editing the opcodes of branch instructions identified by profiler 312 as being highly miss-predicted branches. The opcode editor 314 may receive an address of a highly miss-predicted branch instruction from profiler component 312 and modify reserved bits of the opcode pointed to by the received address to provide an indication to the processor 320 that the modified opcode references a highly miss-predicted branch instruction.

The operating system 315 may load the program instructions of the application 305 into an instruction memory of the computing system 300 and dispatch them to an instruction cache of the processor 320. The operating system 315 may additionally provide an interface for enabling the enhancer 310 to analyze and profile the application 305. The operation system 315 may additionally provide an interface to enable enhancer 310 to modify opcodes of program instructions belonging to the application 305 while the instructions are stored an instruction memory of computing system 300 and/or an instruction cache of the processor 320. The interface may include processor defined interrupt operations and/or other executable operations suitable for accessing and modifying an instruction memory of the computing system 300 or an instruction cache of the processor 320.

FIG. 4 depicts a block diagram of a computing device 400 for implementing a system for hardware controlled enhancement of thread instruction fetch rate in an SMT processor. The computing device 400 may be a general purpose computing device have an SMT processor and configured to execute the operations described herein.

The components of the computing device 400 can include one or more processors 406, a memory 412, a terminal interface 418, a storage interface 420, an Input/Output ("I/O") device interface 422, and a network interface 424, all of which are communicatively coupled, directly or indirectly, for inter-component communication via a memory bus 410, an I/O bus 416, bus interface unit ("IF") 408, and an I/O bus interface unit 414.

The computing device 400 may include one or more general-purpose programmable central processing units (CPUs) 406A and 406B, herein generically referred to as the processor 406. In an embodiment, the computing device 400 may contain multiple processors; however, in another embodiment, the computing device 400 may alternatively be a single CPU device. Each processor 406 executes instructions stored in the memory 412. Furthermore, each processor 406 may be an SMT processor configured to simultaneously execute instructions from multiple threads, and to implement the thread instruction fetch rate control operations described herein.

The computing device 400 may include a bus interface unit 408 to handle communications among the processor 406, the memory 412, the display system 404, and the I/O bus interface unit 414. The I/O bus interface unit 414 may be coupled with the I/O bus 416 for transferring data to and from the various I/O units. The I/O bus interface unit 414 may communicate with multiple I/O interface units 418, 420, 422, and 424, which are also known as I/O processors (IOPs) or I/O adapters (IOAs), through the I/O bus 416. The display system 404 may include a display controller, a display memory, or both. The display controller may provide video, audio, or both types of data to a display device 402. The display memory may be a dedicated memory for buffering video data. The display system 404 may be coupled with a display device 402, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 404 may be on board an integrated circuit that also includes the processor 406. In addition, one or more of the functions provided by the bus interface unit 408 may be on board an integrated circuit that also includes the processor 406.

The I/O interface units support communication with a variety of storage and I/O devices. For example, the terminal interface unit 418 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 426 and the computing device 400, may receive output data via the user output devices. For example, a user interface may be presented via the user I/O device 426, such as displayed on a display device, played via a speaker, or printed via a printer.

The storage interface 420 supports the attachment of one or more disk drives or direct access storage devices 428 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 428 may be implemented via any type of secondary storage device. The contents of the memory 412, or any portion thereof, may be stored to and retrieved from the storage device 428 as needed. The I/O device interface 422 provides an interface to any of various other I/O devices or devices of other types, such as printers or fax machines. The network interface 424 provides one or more communication paths from the computing device 400 to other digital devices and computer systems.

Although the computing device 400 shown in FIG. 4 illustrates a particular bus structure providing a direct communication path among the processors 406, the memory 412, the bus interface 408, the display system 404, and the I/O bus interface unit 414, in alternative embodiments the computing device 400 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 414 and the I/O bus 408 are shown as single respective units, the computing device 400, may include multiple I/O bus interface units 414 and/or multiple I/O buses 416. While multiple I/O interface units are shown, which separate the I/O bus 416 from various communication paths running to the various I/O devices, in other embodiments, some or all of the I/O devices are connected directly to one or more system I/O buses.

In various embodiments, the computing device 400 is a multi-user mainframe computer system, a single-user system, or a server computer or similar device that has little or no direct user interface, but receives requests from other computer systems (clients). In other embodiments, the computing device 400 may be implemented as a desktop computer, portable computer, laptop or notebook computer, tablet computer, pocket computer, telephone, smart phone, or any other suitable type of electronic device.

In an embodiment, the memory 412 may include a random-access semiconductor memory, storage device, or storage medium (either volatile or non-volatile) for storing or encoding data and programs. In another embodiment, the memory 412 represents the entire virtual memory of the computing device 400, and may also include the virtual memory of other computer systems coupled to the computing device 400 or connected via a network 430. The memory 412 may be a single monolithic entity, but in other embodiments the memory 412 may include a hierarchy of caches and other memory devices. For example, memory may exist in multiple levels of caches, and these caches may be further divided by function, so that one cache holds instructions while another holds non-instruction data, which is used by the processor. Memory 412 may be further distributed and associated with different CPUs or sets of CPUs, as is known in any various so-called non-uniform memory access (NUMA) computer architectures.

The memory 412 may store all or a portion of the components and data shown in FIG. 1-3. In particular, the memory 412 may store the application 413A and enhancer 413B. The application 413A may be a computer program, like the application 305 (FIG. 3), executable by the computing device 400. The enhancer 413B may be a software compiler based enhancer and/or a dynamic enhancer having computer executable instructions for performing the analyzing, profiling and opcode editing operations of the present disclosure. The enhancer 413B may be an embodiment of the enhancer 205 (FIG. 2) and/or the enhancer 310 (FIG. 3). Some or all of the components and data shown in FIG. 1-3 may be on different computer systems and may be accessed remotely, e.g., via a network 430. The computing device 400 may use virtual addressing mechanisms that allow the programs of the computing device 400 to behave as if they only have access to a large, single storage entity instead of access to multiple, smaller storage entities. Thus, while the components and data shown in FIG. 1-3 are illustrated as being included within the memory 412, these components and data are not necessarily all completely contained in the same storage device at the same time. Although the components and data shown in FIG. 1-3 are illustrated as being separate entities, in other embodiments some of them, portions of some of them, or all of them may be packaged together.

In an embodiment, the components and data shown in FIG. 1-3 may include instructions or statements that execute on the processor 406 or instructions or statements that are interpreted by instructions or statements that execute the processor 406 to carry out the functions as further described below. In another embodiment, the components shown in FIG. 1-3 may be implemented in hardware via semiconductor devices, chips, logical gates, circuits, circuit cards, and/or other physical hardware devices in lieu of, or in addition to, a processor-based system. In an embodiment, the components shown in FIG. 1-3 may include data in addition to instructions or statements.

FIG. 4 is intended to depict representative components of the computing device 400. Individual components, however, may have greater complexity than represented in FIG. 4. In FIG. 4, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different ways, including using various computer applications, routines, components, programs, objects, modules, data structures etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
a memory to store an enhancer to identify a branch instruction in a first executing thread, the branch instruction having a miss-prediction rate above a threshold, wherein threads executing on the system have an instruction fetch priority to determine a rate at which instructions belonging to a respective executing thread are retrieved from an instruction cache, and the instruction fetch priority of the first executing thread initially specifies a default rate for fetching instructions;
an instruction update unit to modify an operation code (opcode) of the branch instruction of the first executing thread, wherein a modified opcode of a branch instruction indicates an instruction fetch priority for an executing thread; and
a processor, including:
an instruction decode unit to set a modified instruction fetch priority of the first executing thread based on the modified opcode of the branch instruction, and
an instruction fetch unit to retrieve instructions for the first executing thread from the instruction cache at a first rate, the first rate indicated by the modified instruction fetch priority of the first executing thread.

2. The system of claim 1, wherein the processor further includes:
an execution unit to process a branch instruction; and
a register to track the processing of a branch instruction;
wherein the instruction fetch unit is further configured to reset the instruction fetch priority of the first executing thread and retrieve instructions for the first executing thread at the default rate when the register indicates that the execution unit has processed the branch instruction.

3. The system of claim 2, wherein the first rate is a lower rate than the default rate for fetching instructions for the first executing thread.

4. The system of claim 2, wherein:
the enhancer identifies first and second branch instructions of a second executing thread, the first and second branch instructions having respective first and second opcodes, wherein:

the instruction update unit modifies the first opcode in response to a first miss-prediction rate associated with the first branch instruction being above a first threshold,
the instruction update unit modifies the second opcode in response to a second miss-prediction rate associated with the second branch instruction being above a second threshold,
the instruction decode unit sets the instruction fetch priority of the second executing thread to a first level, at a first time, based on the first opcode when the first branch instruction is decoded,
the instruction decode unit sets the instruction fetch priority of the second executing thread to a second level, at a second time subsequent to the first time, based on the second opcode when the second branch instruction is decoded and the register indicates that the execution unit has not processed the first branch instruction, and
the instruction fetch unit retrieves instructions for the second executing thread from the instruction cache at a second rate based on the first instruction fetch priority being set to the first level and at a third rate based on the instruction fetch priority being set to the second level, wherein the third rate is slower than the second rate, and the second rate is slower than the default rate for fetching instructions.

5. The system of claim 1, wherein the instruction update unit modifies an opcode of a branch instruction while the branch instruction is stored in the instruction cache.

6. The system of claim 1, the enhancer further to:
determine the miss-prediction rate of a branch instruction based on statistical branch miss-prediction information collected from a branch history buffer of the processor.

7. The system of claim 1, the instruction decode unit further to:
changing the instruction fetch priority of a second executing thread based on a modified opcode.

8. The system of claim 1, the instruction fetch unit further to:
retrieve instructions for a second executing thread at a second rate based on the instruction fetch priority of the first executing thread.

9. The system of claim 1, wherein the enhancer is executable by the processor at compile time.

10. The system of claim 1, wherein the enhancer is executable by the processor at run time.

11. The system of claim 1, wherein the instruction cache is at least one of a cache to store un-decoded instructions and a cache to store partially decoded instructions.

12. A method, comprising:
identifying a branch instruction in a first executing thread, the branch instruction having a miss-prediction rate above a threshold, wherein threads executing on a computing system having an instruction fetch priority to determine a rate at which instructions belonging to a respective executing thread are retrieved from an instruction cache, and the instruction fetch priority of the first executing thread initially specifies a default rate for fetching instructions;
modifying an operation code (opcode) of the branch instruction of the first executing thread, wherein a modified opcode of a branch instruction indicates an instruction fetch priority for an executing thread; and
setting a modified instruction fetch priority of the first executing thread based on the modified opcode of the branch instruction, and retrieving instructions for the first executing thread from the instruction cache at a first rate, the first rate indicated by the modified instruction fetch priority of the first executing thread.

13. The method of claim 12, further comprising:

processing a branch instruction; and tracking the processing of a branch instruction;

determining, based on the tracking, whether the branch instruction has been processed; and resetting the instruction fetch priority of the first executing thread and retrieving instructions for the first executing thread at the default rate in response to determining that the branch instruction has not been processed.

14. The method of claim 13, wherein the first rate is a lower rate than the default rate for fetching instructions for the first executing thread.

15. The method of claim 12, further comprising:

identifying first and second branch instructions of a second executing thread, the first and second branch instructions having respective first and second opcodes;

modifying the first opcode in response to a first miss-prediction rate associated with the first branch instruction being above a first threshold;

modifying the second opcode in response to a second miss-prediction rate associated with the second branch instruction being above a second threshold;

setting the instruction fetch priority of the second executing thread to a first level, at a first time, based on the first opcode when the first branch instruction is decoded;

tracking the processing of the first branch instruction;

determining, based on the tracking, that the first branch instruction has not been processed;

setting, based on the determining, the instruction fetch priority of the second executing thread to a second level, at a second time subsequent to the first time, based on the second opcode when the second branch instruction is decoded; and retrieving instructions for the second executing thread from the instruction cache at a second rate based on the first instruction fetch priority being set to the first level and at a third rate based on the instruction fetch priority being set to the second level, wherein the third rate is slower than the second rate, and the second rate is slower than the default rate for fetching instructions.

16. The method of claim 12, further comprising:

modifying an opcode of a branch instruction while the branch instruction is stored in the instruction cache.

17. The method of claim 12, further comprising:

determining the miss-prediction rate of a branch instruction based on statistical branch miss-prediction information collected from a branch history buffer of the processor.

18. The method of claim 12, further comprising:

changing the instruction fetch priority of a second executing thread based on a modified opcode.

19. The method of claim 12, further comprising:

retrieving instructions for a second executing thread at a second rate based on the instruction fetch priority of the first executing thread.

20. The method of claim 12, further comprising:

executing the enhancer during at least one of compile time and runtime.

\* \* \* \* \*